INVENTOR.
MELVIN G. ALWOOD

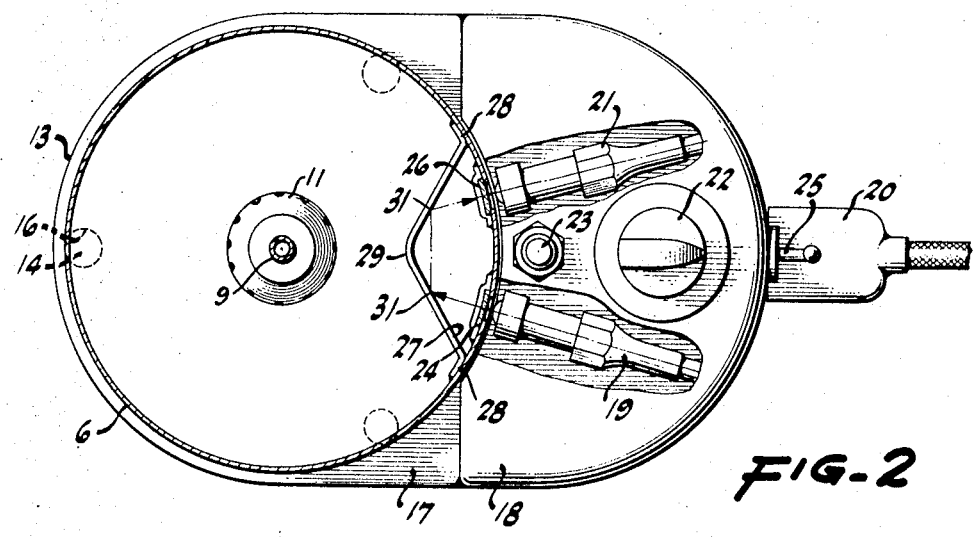
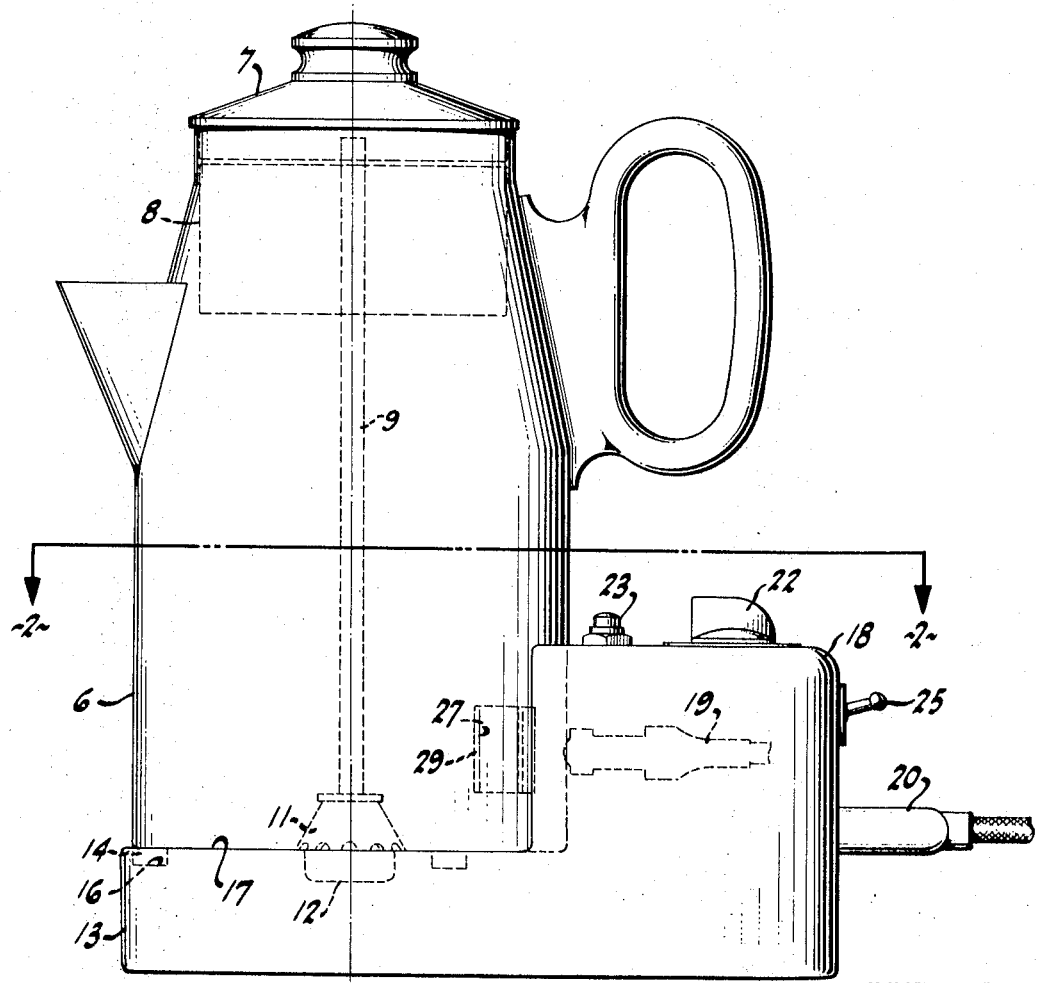

BY

ATTORNEYS

April 27, 1971     M. G. ALWOOD     3,576,646

METHOD AND APPARATUS FOR MAKING COFFEE

Filed July 15, 1968     3 Sheets-Sheet 3

INVENTOR.
MELVIN G. ALWOOD

BY

ATTORNEYS

United States Patent Office 3,576,646
Patented Apr. 27, 1971

3,576,646
METHOD AND APPARATUS FOR MAKING COFFEE
Melvin G. Alwood, 733 Butte St., Redding, Calif. 96001
Filed July 15, 1968, Ser. No. 745,018
Int. Cl. A23f 1/08
U.S. Cl. 99—71
7 Claims

ABSTRACT OF THE DISCLOSURE

In a pot in which coffee is brewed to any desired strength by the continued application of heat thereto, a beam of light is passed through a representative portion of the coffee to a photo-sensitive detecting device connected to circuitory which turns off the heat to the pot when the strength of the coffee, as measured by the opacity thereof, reaches a desired level.

BACKGROUND OF THE INVENTION

The invention relates to the making of coffee and in particular it relates to apparatus and a method for making coffee in which the strength of the coffee being made is optically sensed and the making ceased when a desired strength has been reached.

Coffee is commonly made in a pot to which heat is externally supplied and in which the strength of the coffee is determined by the length of time this heat is supplied thereto. One common form of such a coffee maker is the percolator in which coffee grounds are suspended above water in a porous container and water is supplied to the top of the grounds by boiling the portion of it contained within a tube which extends from the top of the container to the bottom of the pot. The water then percolates down through the coffee grounds and the porous container to return to the bottom of the pot, forming coffee in the process. This process will continue, and the coffee will get stronger, as long as heat is supplied to the water to boil it and as long as the water lasts, although a desirable strength for the coffee is usually reached long before the water is completely boiled away. The brewing of the coffee is generally stopped when the desired strength is reached by lowering the amount of heat supplied to the pot to a point where the water will no longer boil at some fixed period of time after the beginning of the process.

By the present apparatus and method, the desired character of repeated batches of coffee in different quantities is uniform.

SUMMARY OF THE INVENTION

The invention provides another way that the coffee making process may be stopped when a desired strength of the coffee has been reached. As the strength of the coffee increases it also becomes darker and more opaque. Accordingly, as a beam of light is shined into the coffee, less of the light will emerge as the strength and opacity of the coffee increases. The intensity of the light beam emerging from the coffee may thus be used as a measure of its strength, and this is in fact a more direct indicator of the strength of the coffee than its brewing time, since the opacity is an actual physical characteristic of the coffee itself. The invention utilizes this optical characteristic of coffee to determine its brewing time.

It is thus an object of the invention to provide a coffee maker in which the strength of the coffee brewed is determined by a physical characteristic of the coffee itself.

Another object of the invention is to provide a coffee maker in which the strength of the coffee is determined by its opacity.

Another object of the invention is to provide a coffee maker in which the strength of the coffee is determined by the intensity of a light beam transmitted through the coffee upon its emergence therefrom.

Another object of the invention is to provide a method for making coffee in which a physical characteristic of the brewed coffee determines its strength.

Another object of the invention is to provide a method for making coffee in which the opacity of the coffee determines its strength.

Another object of the invention is to provide a method for making coffee in which a light beam is passed therethrough and its strength upon emergence determines the strength thereof.

Still another object of the invention is to provide better apparatus and methods for making coffee.

Other objects and advantages of the invention will become apparent from the drawings, specification, and claims included herewith.

BRIEF DESCRIPTION OF THE DRAWINGS

FIG. 1 is an elevational view of a coffee maker embodying the invention;

FIG. 2 is a cross sectional view of the coffee maker taken along line 2—2 in FIG. 1 in which portions of the base are broken away;

DESCRIPTION OF THE PREFERRED EMBODIMENTS

Figure 3:
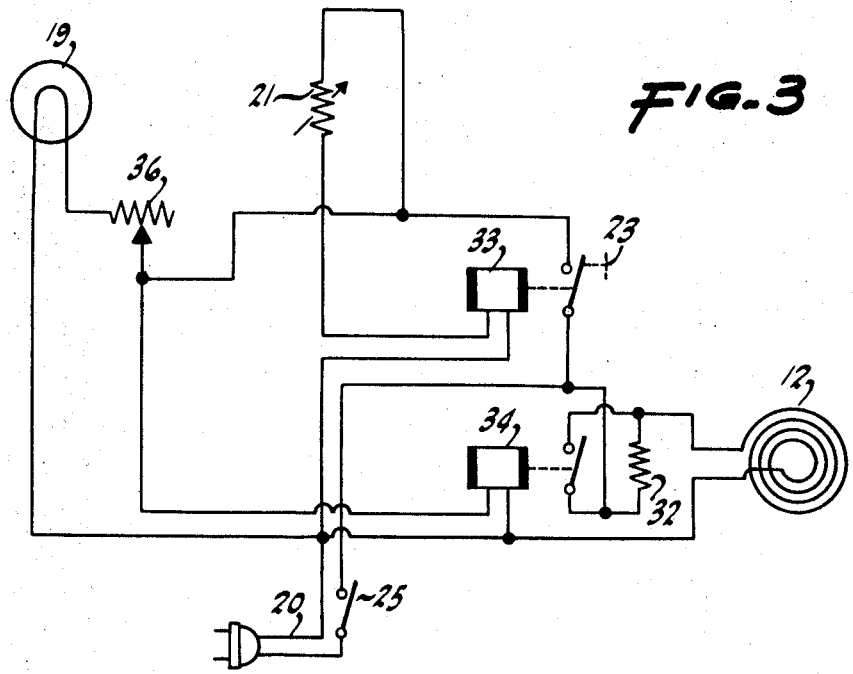
FIG. 3 is a circuit diagram of a circuit which may be used to operate the coffee maker of the invention.

While the invention may be used with any coffee making device wherein the brewing continues as long as heat is supplied, it will be described in combination with a percolator since this is the most common of such devices. The standard percolator includes a pot 6 having a top 7 (FIG. 1). A basket 8 for containing coffee grounds is suspended near the top 7 and a tube 9 extends from the top of the basket to the bottom of the pot for supplying water to the top of the coffee grounds in the basket. The bottom portion 11 of the tube 9 is generally widened and somewhat perforated about its lower edge to allow water to readily flow thereunder and yet to confine a significant portion of water within this bottom portion 11. Heat, sufficient to boil the water in the pot, is supplied externally to the pot in the area thereof engaged by this bottom portion 11. Accordingly, water boiled within this lower portion will be forced up through the tube 9, and the top 7 will deflect this water onto the grounds in the basket 8. The water then percolates through the grounds and returns to the bottom of pot 6 as coffee. The heat is conventionally supplied to the pot by an electrical heating element 12, and this brewing process will continue with the coffee getting stronger as long as this heat is supplied and as long as the water lasts.

In the invention, the heating element 12 is contained in a base 13 (FIGS. 1 and 2) upon which the pot 6 is placed during the brewing cycle. Feet 14 on the bottom of the pot are receivable in recesses 16 in the base so that only one orientation of the pot with respect to the base is allowed.

While the portion 17 of the base 13 on which the pot 6 stands is flat and need only stand high enough to contain the heating element 12, a raised portion 18 extends from one side thereof upwardly alongside of the pot 6 when it is positioned on the base. Mounted within this raised portion of the base, are a light source 19 and a photosensitive device 21. The light source 19 may be of any conventional type which may be mounted to cast a beam parallel to the bottom of the coffee pot and towards its center. The photo-sensitive device 21 may also be of any conventional type which may be mounted to receive a beam of light travelling parallel to the base of the coffee pot from the center thereof. This device may take the form of a light sensitive resistor whose resistance decreases as the intensity of the light shown upon it increases, or it may utilize any other effect wherein some electrical characteristic such as resistance, voltage or current varies with the intensity of the light shined thereon. A light sensitive resistor will be used in the circuit described below.

Also mounted on the raised portion 18 of the base 13, in a position for easy manipulation by a user, are a power switch 25 by which the coffee maker may be turned off and on and the heating element 12 brought to a low heat to keep the coffee warm, a knob 22 by which the strength of the coffee desired may be selected and a button 23 by which the brewing cycle may be begun. The interrelationships and functions of the light source 19, the photosensitive device 21, the power switch 25, the knob 22 and the button 23 will be described below. A cord 20 for supplying power to the coffee maker extends from the base 13 for connection to a standard wall socket.

In the portion of the pot 6 which is adjacent to the raised portion 18 of the base 13 are mounted a pair of windows 24 and 26. The window 24 is so mounted that light from the light source 19 may pass therethrough into the coffee in the pot in the direction of the center of the pot, while the window 26 is so mounted that light travelling through the coffee from the direction of the center of the pot may pass therethrough and fall upon the photosensitive device 21. Mounted within the pot is a reflective surface 27 so formed that light from the light source 19, entering the pot through the window 24, will be reflected thereby to pass out of the pot through window 26 onto the photo-electric device 21 and so mounted on the inside of the pot that coffee may pass between the surface 27 and windows 24 and 26. The reflecting surface shown in FIGS. 1 and 2 may be a piece of metal having a shiny surface, such as stainless steel, which is attached at its ends 28 to the inside of the pot 6 and bent an appropriate amount at its center 29 so that the light beam is reflected at two points 31 (FIG. 2) thereon as it passes between the windows 24 and 26. The top and bottom of the space formed by the surface 27 and the pot 6 are open so that coffee may flow therethrough and the coffee therein will be representative of the coffee in the pot at all times.

In operation, the pot 6 is conventionally prepared as a percolator and is placed upon the base 13 with the feet 14 in the recesses 16. The windows 24 and 26 will thus be aligned with the light source 19 and the photo-sensitive device 21, respectively. The strength of the coffee desired is selected by the knob 22, and the brewing cycle is begun by turning the switch 25 on and depressing the button 23. As the brewing cycle continues and the coffee in the pot 6 darkens, less and less light from the light source 19 will be able to be reflected from the surface 27 into the photosensitive device 21 due to the increasing opacity of the coffee. When the amount of light received by the photosensitive device decreases to a certain amount, the heating element is turned down so that the brewing of the coffee ceases.

A circuit by which the above described coffee maker may be operated is shown in FIG. 3. Where possible the numbers used to identify components in FIGS. 1 and 2 will be used to identify their schematic representations in FIG. 3.

When the switch 25 is turned on, power is supplied to the heating element 12 through the resistor 32. The heating element will be warmed, but because of the power dissipated in the resistor, not enough heat will be supplied to cause the water to boil. The button 23 may now be depressed to start the brewing cycle. In the circuit of FIG. 3, button 23 mechanically closes the relay 33, although this may be done by an appropriate electrical circuit also. The relay 33 is a normally open relay which may have contacts of a relatively low current capacity. It must be selected however such that its coil will hold it closed at a relatively low current and such that it will open when the current passing therethrough drops below a certain fixed value. It, together with the other components of this circuit, are mounted in the base 13.

Closing the relay 33 provides three different functions. The first is the closing of the relay 34, a normally open, high current relay having contacts capable of carrying sufficient current to operate the heating element 12. The closing of the relay 34 in turn by-passes resistor 32 and causes full power to be supplied to the heating element 12 such that sufficient heat may be applied to the pot 6 to cause the water therein to begin to boil and the brewing cycle to begin. The second function is that the light source 19 is turned on to an intensity governed by the setting on the potentiometer 36 in series therewith. The potentiometer 36 is controlled by the knob 24 mounted on the raised portion 18 of the base 13. The third function is that power is supplied to one side of the photosensitive device 21. Since the light source 19 has been turned on, and light therefrom may readily pass through the clear water in the coffee pot to the photo-sensitive device, the resistance of the device will be low and enough current will pass therethrough and be supplied to the relay 33 to hold it closed when the button 23 has been released.

As the opacity of the coffee increases as it gets stronger, less and less of the light from the source 19 will be able to reach the photo-sensitive device 21 and its resistance will increase. Consequently, the current through the coil of the relay 33 will be decreased and, at that certain fixed value, the relay will open. This will turn off the light source 19, discontinue the power to the photo-sensitive device 21, and open the relay 34, thereby cutting the amount of power to heating element 12 to that supplied through the resistor 22 with the result that the water will no longer boil and the brewing of the coffee will cease. The characteristics of the photo-sensitive device 21 and the fixed current value for the relay 33 may be chosen such that this will occur at a reasonable strength of coffee, and a variation of strengths about this reasonable strength may be attained by adjusting the potentiometer 36 with the knob 24 for different intensities of the light source 19.

Figure 5:
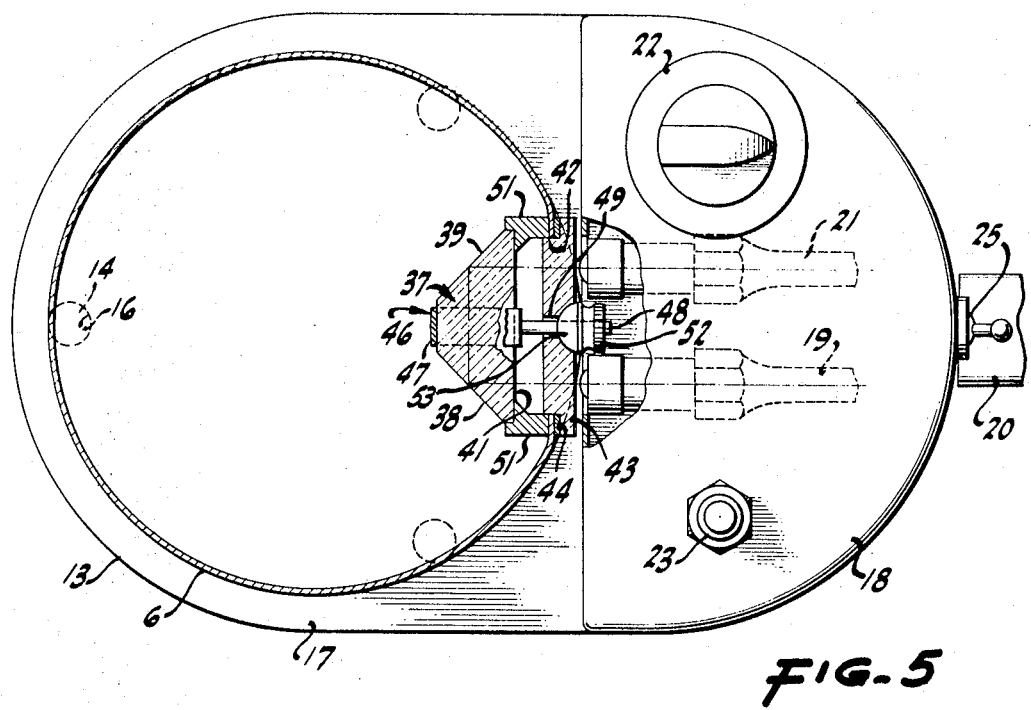
FIG. 5 is a cross sectional view of the modified coffee maker of FIG. 4 taken along line 5—5 of FIG. 4 in which portions of the base are shown broken away.
Figure 4:
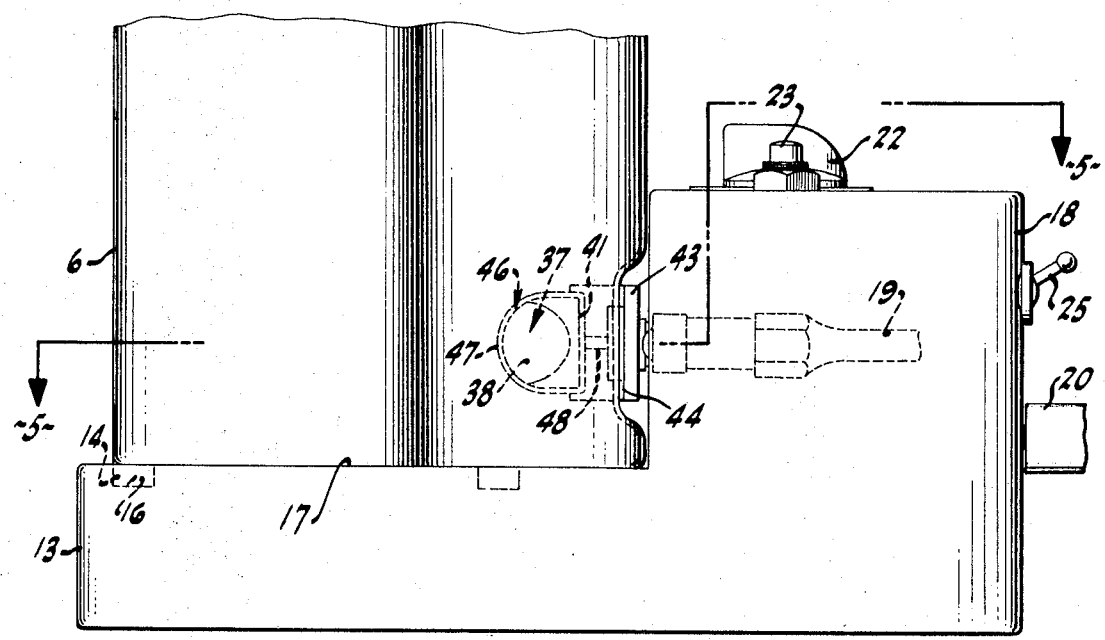
FIG. 4 is a fragmentary elevational view of a coffee maker embodying a modified form of the invention.

FIGS. 4 and 5 show a modified embodiment of the invention wherein a removable prism 37 is used in place of the metal reflecting surface 27 in FIGS. 1 and 2. This embodiment may be easier to manufacture and clean.

The base 13 of the embodiment of FIGS. 4 and 5 is identical to that of FIGS. 1 and 2 except that the light source 19 and the photo-sensitive device 21 are mounted relatively close to one another and in a position such that the light beam from the light source is parallel to the light beam received by the photo-sensitive device.

The prism 37 has a pair of faces 38 and 39 which are perpendicular to one another and are silvered such that light incident upon them from the interior of the prism is reflected. The silver in turn is coated by a suitable coffee resisting substance. The prism 37 also has a face 41 which is at a 45° angle to each of the faces 38 and 39, such that a light beam entering the prism perpendicular to the face 41 will be reflected first at face 38 and then at face 39 to emerge from the prism through face 41 perpendicular thereto and parallel to the incoming beam.

A hole 42 is cut in the side of the pot 6 adjacent the raised portion 18 of the face 13 having slightly smaller dimensions than the face 41 of the prism 37 in a position such that light beams passing from the light source 19 and to the photo-sensitive device 21 will pass therethrough. The perimeter of the hole 42 and a marginal portion thereabout are bent to form a planar surface perpendicular to the paths of the light beams passing from the light source 19 and to the photo-sensitive device 21. The hole 42 is covered by a rectangular sheet 43 of transparent material, such as glass or plastic, having sufficient dimensions to overlie the marginal portion about the hole 42. A seal formed to lie between the sheet 43 and the marginal portion about the hole 42 is positioned therebetween to close the hole to coffee. Prism 37 is mounted across the inside of this hole by a bolt 46 having a portion 47 which is wrapped around the prism and a shank 48 which extends from the center of the face 41 perpendicular thereto to pass through a hole 49 in the center of the sheet 43. Spacers 51 fixed to the ends of the face 41 adjacent the faces 38 and 39 engage the marginal portion of the hole 42 to hold the face 41 of the prism a sufficient distance from the sheet 43 to allow a representative portion of the coffee in the pot to pass therebetween. A nut 52 screwed onto threads on the shank 48 serves to hold the prism in place and to compress the seal 44 between the marginal portion of the hole 42 and the sheet 43 to affect the closure of the hole 42. A bushing 53 on the shank 48 between the nut 52 and the sheet 43 in turn closes the hole 49.

The operation of the embodiment shown in FIGS. 4 and 5 is precisely the same as that shown in FIGS. 1 and 2. With the pot 6 in place upon the base 13, the button 23 is depressed turning the heating element 12 up to full heat and causing the light source 19 to emit a beam through the sheet 43 to be reflected from the faces 38 and 39 of the prism 37 back through the sheet 43 into the photo-sensitive device 21. The opacity of the coffee is thus detected in the same way and the circuit shown in FIG. 3 may be equally well applied in this embodiment.

Figure 6:
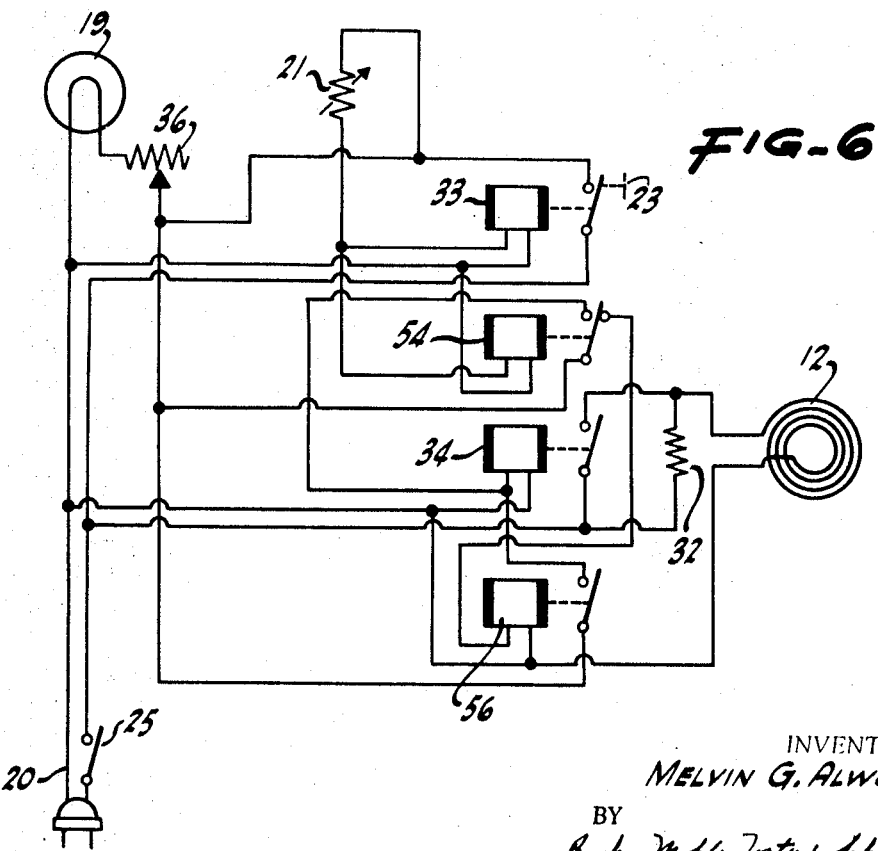
FIG. 6 is a circuit diagram of a modified circuit which may be used to operate the coffee maker of the invention.

An alternate circuit to that shown in FIG. 3, which embodies an additional brewing step, is shown in FIG. 6. Since all of the elements of FIG. 3 are present in this circuit, and they function in exactly the same way, they will be given the same numbers. In addition, however, there is a second relay 54, like relay 33, which differs from relay 33 only in that it also has a normally closed contact and in that it opens at a current having a higher fixed value. Also present is a normally open time delay relay 56 which is designed to close a fixed period of time after the power is supplied to the coil thereof.

As in FIG. 3, depressing the button 23 closes the relay 33 which turns on the light source 19 to an intensity determined by the setting on the potentiometer 36 and supplies power to the photo-sensitive device 21. Power passing through the photo-sensitive device 21 holds the relay 33 closed and closes the relay 54, the coil of which is connected in parallel to the coil of the relay 33. Closing the relay 54 in turn closes the relay 34 which supplies full power to the heating element 12. As the opacity of the coffee increases, the intensity of the beam striking photo-sensitive device 21 decreases and the resistance thereof increase, decreasing the current passing through the coils of relays 33 and 54. The characteristics of the photo-sensitive device 21 and the relay 33 are still chosen such that the relay 33 opens when the desired strength of the coffee in the pot 6 is reached, however because the relay 54 opens at a higher current than the relay 33, it will open before this desired strength is reached. When this occurs the relay 34 opens turning off the power to the heating element 12. Opening of the relay 54, also completes a circuit through the normally open contact thereof which activates the time delay relay 56. As the time before the contacts of the time delay relay 56 close passes, water already in the coffee grounds in the basket 8 continues to percolate therethrough and to return to the bottom of the pot, thereby strengthening the coffee. When the time period has run, the time delay relay 56 closes which in turn closes relay 34 once again, reheating the heating element 12 and starting the brewing process once more. This will continue until the desired strength has been reached and the relay 33 opened to cease the brewing process as before. If, however, the coffee reaches the desired strength during the interval when the heating element 12 is turned off because of the water still percolating through the coffee in the basket 8, the relay 33 will open during the time period of the time delay relay 56, and the heating element 12 will not again be activated. By the use of this circuit, the desired strength will not be bypassed because of the water percolating through the coffee in the basket 8 when the heating element is turned off as might happen with the circuit of FIG. 3.

From the foregoing description it is seen that the method that is practiced is one in which coffee is brewed to a predetermined color density from a body of clear water and a quantity of ground coffee that is separate from the body. The color density is progressively increased by applying heat to the body of water until it reaches its boiling point and by then circulating water of the body through the ground coffee and back to the body. A beam of light is passed through the body and, upon emergence from the body, onto an electro-responsive medium having an electrical characteristic regulated by the light so that its value is related to the degree of intensity of the light. The value of this electrical characteristic is then utilized to automatically reduce the temperature of the body to below its boiling point at the predetermined color density by reducing the heat applied to the body to a temperature less than that sufficient to maintain the body at its boiling temperature.

The method may also include adjusting the intensity of the beam of light to predetermine the color density of the brewed coffee, reflecting the beam of light during its passage through the body, or utilizing the value of the electrical characteristic to automatically reduce the temperature of the body of water to below its boiling point at a color density less than the predetermined density by reducing the heat applied to the body to less than that sufficient to maintain the body at its boiling temperature and, at a predetermined interval of time thereafter, automatically reapplying heat to the body to again increase its temperature to its boiling point if the value of the electrical characteristic of the electro-responsive medium still corresponds to a color density less than the predetermined color density.

It should be understood that the above detailed description discloses the preferred embodiments of the invention, but it is not intended to be limiting, as other forms and modifications may occur to those skilled in the art which will not depart from the spirit of the invention and which come within the scope of the appended claims.

I claim:

1. The method of brewing coffee comprising the steps of:

(a) progressively increasing the density of the color of a body of clear water by applying heat to said body until the latter reaches the boiling point thereof and circulating the water of said body, so heated, through a quantity of ground coffee that is separate from said body and back to the latter, (b) passing a beam of light through said body onto a medium electro-responsive for regulating an electrical characteristic thereof having a value related to the degree of intensity of said beam at the emergence thereof from said body; and then, (c) reducing the temperature of said body to below said boiling point by automatically utilizing the value of said electrical characteristic at a predetermined density of said color to reduce the heat so applied to said body to a temperature that is insufficient to maintain the body at said boiling temperature.

(d) reducing the temperature of said body to below said boiling point by automatically utilizing the value of said electrical characteristic at a density of said color less than said predetermined density to reduce the heat so applied to said body to a temperature that is insufficient to maintain the body at said boiling temperature; and (e) a predetermined interval of time thereafter, automatically reapplying heat to said body to increase the temperature of said body to said boiling point thereof if the value of said electrical characteristic corresponds to a density of said color less than said predetermined density at the end of said interval.

2. In the method of claim 1, the additional step of;
(f) predetermining the density of said color by adjusting the intensity of said beam of light.

3. In the method of claim 1, the additional step of;
(f) reflecting said beam of light in its passage through said body onto said medium.

4. In a coffee maker including a receptacle for ground coffee and a body of water separate from said ground coffee, heating means for heating said body of water to the boiling point thereof and circulating means for circulating the boiling water of said body through said ground coffee and back to said body to form a brew of coffee in said receptacle:

(a) electrical heating means on said receptacle in heat transfer relation to said body of water when the latter is in said receptacle; and (b) means responsive to variations in the color density of the water resulting from said circulation of water through said coffee grounds operatively connected with said heating means for reducing the current to the latter upon said water reaching a predetermined density of color, whereby the brew of coffee in said receptacle will be of a predetermined uniform strength at the time of reducing said current independently of the amount of said ground coffee in said receptacle, (c) said means responsive to variations in the color density of the water is also operatively connected with said heating means for reducing the current to the latter upon said water reaching a density of color less than said predetermined density and for increasing the current to said heating element at a predetermined interval of time later if the density of color of said water has not reached said predetermined density at the end of said interval.

5. In the coffee maker of claim 4;

(d) a source of a beam of light mounted to transmit said beam into said body to pass through a representative portion thereof with an intensity upon emergence from said portion which decreases as said color density of said water increases; and (e) said means responsive to variations in the color density of the water includes a light sensitive detector positioned in said beam of light upon emergence thereof from said portion, (f) said light sensitive detector having an electrical characteristic thereof which is regulated by said light beam to have a value related to the intensity of said light beam upon emergence from said portion.

6. In the coffee maker of claim 5;
(g) means for adjusting the intensity of said light beam from said source to predetermine said density of color.

7. In the coffee maker of claim 5;
(g) means for reflecting said beam of light within said portion during the passage of said beam therethrough from said source to said detector.

References Cited

UNITED STATES PATENTS

| | | | |
|---|---|---|---|
| 1,970,613 | 8/1934 | McDill | 99—11 |
| 2,189,206 | 2/1940 | Griffin | 99—68X |
| 2,502,844 | 4/1950 | Hildreth | 219—105X |
| 2,270,457 | 1/1942 | Martin | 99—285X |
| 2,844,067 | 7/1958 | Borg | 250—218X |
| 2,903,552 | 9/1959 | Jepson et al. | 99—281X |
| 3,141,094 | 7/1964 | Strickler | 250—218 |
| 3,164,663 | 1/1965 | Gale | 88—14 |
| 3,263,553 | 8/1966 | Baruch | 250—226X |
| 3,392,662 | 7/1968 | Schwartz, Jr. | 99—285 |
| 3,285,955 | 5/1968 | Tucker | 99—282X |

DENNIS E. TALBERT, JR., Primary Examiner

U.S. Cl. X.R.

88—14; 99—236, 282; 219—502; 250—218, 226